(12) United States Patent
Chen

(10) Patent No.: US 8,081,845 B2
(45) Date of Patent: Dec. 20, 2011

(54) METHOD AND DEVICE FOR SCALING-UP OR SCALING-DOWN IMAGES WITH THE SAME HARDWARE

(75) Inventor: Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 603 days.

(21) Appl. No.: 12/332,375

(22) Filed: Dec. 11, 2008

(65) Prior Publication Data
US 2009/0285507 A1 Nov. 19, 2009

(30) Foreign Application Priority Data
May 15, 2008 (TW) .............................. 97117808 A

(51) Int. Cl.
*G06K 9/32* (2006.01)
(52) U.S. Cl. ...................................... 382/298; 382/300

(58) Field of Classification Search .................. 382/276, 382/298, 300; 348/571, 580, 581; 358/525, 358/528; 345/606, 609, 660, 667; 708/208
See application file for complete search history.

(56) References Cited

U.S. PATENT DOCUMENTS

| | | | | |
|---|---|---|---|---|
| 5,801,678 A | * | 9/1998 | Huang et al. | 345/667 |
| 7,446,820 B2 | * | 11/2008 | Liang et al. | 348/581 |
| 2005/0213851 A1 | * | 9/2005 | Lin | 382/298 |
| 2007/0041662 A1 | * | 2/2007 | Jeffrey | 382/298 |

* cited by examiner

*Primary Examiner* — Yon Couso
(74) *Attorney, Agent, or Firm* — Thomas|Kayden

(57) ABSTRACT

An image processing device is provided, which scales-up or scales-down images with the same hardware. The device of this invention comprises a line buffer, a first variable, a second variable and a scaler. The scaler practices a scaling-down procedure to scale-down images or scaling-up procedure to scale-up images.

10 Claims, 13 Drawing Sheets

FIG. 4f

METHOD AND DEVICE FOR SCALING-UP OR SCALING-DOWN IMAGES WITH THE SAME HARDWARE

CROSS REFERENCE TO RELATED APPLICATIONS

This Non-provisional application claims priority under 35 U.S.C. §119(a) on Patent Application No(s). 97,117,808, filed in Taiwan, Republic of China on May 15, 2008, the entire contents of which are hereby incorporated by reference.

BACKGROUND OF THE INVENTION

1. Field of the Invention

The present invention relates to image processing methods, and in particular relates to methods for scaling-up or scaling-down images with the same hardware.

2. Description of the Related Art

Demand for greater image processing efficiency has increased along with advancements in multi-media technology. Image processing includes many technological areas, one of which is the scaling-up or scaling-down of images. The hardware used to scale-up and scale-down images is called a scaler.

When scaling-up or scaling-down images, speed and accuracy is required, especially for images such as maps found on the Internet.

However, one method for scaling images, for example, is to store all image data into a large capacity memory in advance and then process the data with a highly efficient processor. Although optimized images are achieved, costs thereof are high. Moreover, methods for scaling images are different among the industry, thus complicating the process for users. Additionally, sometimes, different hardware are required to scale-up and scale-down images, thus complicating design architecture for hardware compatibility and making the process less efficient.

BRIEF SUMMARY OF INVENTION

The present invention provides an image processing method, which is used to scale-upscale-up and scale-down an image with the same hardware, wherein the image comprises a plurality of pixels ($\{a^k_j, 1\square k \square M, 1\square j \square N\}$) arranged in a plurality of lines (M lines) and in a plurality of columns (N columns) forming a two-dimension array. The image processing method comprises: providing a line buffer comprising at least 2N storage cells; providing a first variable and a second variable for cooperating with the line buffer to scale-upscale-up and scale-down the image; and practicing a scaling-down procedure when scaling-down the image, wherein the scaling-down procedure comprises: storing the pixels ($\{a^k_j, j=1, 2, 3, \ldots N\}$) of the k-th line of the array into the line buffer from the first storage cell to the N-th storage cell in order, respectively; storing the pixel ($a^{k+1}_j$) of the (k+1)-th line and the j-th column of the array into the first variable; storing the pixel ($a^{k+1}_{j+1}$) of the (k+1)-th line and the (j+1)-th column of the array into the second variable; practicing a first algorithm to determine a first new pixel ($b^k_j$) based on the pixels ($a^k_j$, $a^k_{j+1}$, $a^{k+1}_j$ and $a^{k+1}_{j+1}$) stored in the j-th column, the (j+1)-th column of the line buffer, the first variable and the second variable, respectively, and outputting the first new pixel ($b^k_j$); removing the pixel stored in the first variable to the j-th storage cell of the line buffer; removing the pixel stored in the second variable to the first variable; storing the pixel ($a^{k+1}_{j+2}$) of the (k+1)-th line and the (j+2)-th column of the array into the second variable; and practicing the first algorithm to determine a second new pixel ($b^k_{j+1}$) based on the pixels ($a^k_{j+1}$, $a^k_{j+2}$, $a^{k+1}_{j+1}$ and $a^{k+1}_{j+2}$) stored in the (j+1)-th column, the (j-2)-th column of the line buffer, the first variable and the second variable, respectively, and outputting the second new pixel ($b^k_{j+1}$).

The present invention also provides an image processing apparatus, used to scale-upscale-up and scale-down an image with the same hardware, wherein the image comprises a plurality of pixels ($\{a^k_j, 1\square k \square M, 1\square j \square N\}$) arranged in a plurality of lines (M lines) and in a plurality of columns (N columns) forming a two-dimension array, comprising: a line buffer, comprising at least 2N storage cells; a first variable and a second variable, for cooperating with the line buffer to scale-upscale-up and scale-down the image; and a scaler, for practicing a scaling-down procedure to scale down the images, wherein the scaling-down procedure comprises: storing the pixels ($\{a^k_j, j=1, 2, 3, \ldots N\}$) of the k-th line of the array into the line buffer from the first storage cell to the N-th storage cell in order, respectively; storing the pixel ($a^{k+1}_j$) of the (k+1)-th line and the j-th column of the array into the first variable; storing the pixel ($a^{k+1}_{j+1}$) of the (k+1)-th line and the (j+1)-th column of the array into the second variable; practicing a first algorithm to determine a first new pixel ($b^k_j$) based on the pixels ($a^k_j$, $a^k_{j+1}$, $a^{k+1}_j$ and $a^{k+1}_{j+1}$) stored in the j-th column, the (j+1)-th column of the line buffer, the first variable and the second variable, respectively, and outputting the first new pixel ($b^k_j$); removing the pixel stored in the first variable to the j-th storage cell of the line buffer; removing the pixel stored in the second variable to the first variable; storing the pixel ($a^{k+1}_{j+2}$) of the (k+1)-th line and the (j+2)-th column of the array into the second variable; and practicing the first algorithm to determine a second new pixel ($b^k_{j+1}$) based on the pixels ($a^k_{j+1}$, $a^k_{j+2}$, $a^{k+1}_{j+1}$ and $a^{k+1}_{j+2}$) stored in the (j+1)-th column, the (j+2)-th column of the line buffer, the first variable and the second variable, respectively, and outputting the second new pixel ($b^k_{j+1}$).

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein:

FIG. 4f is an illustrative diagram of the storage data in the line buffer in the step S408 of the present invention.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
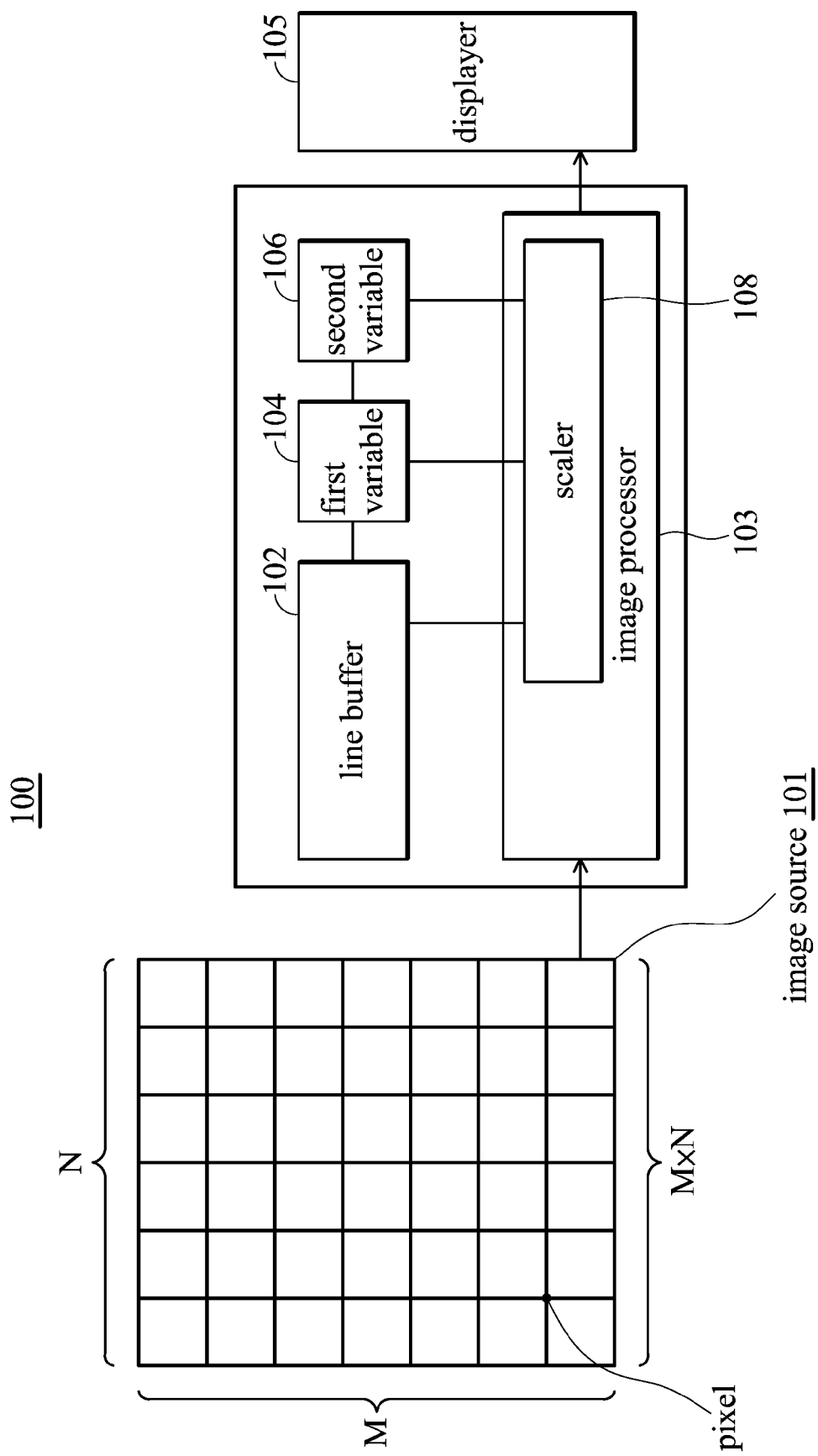
FIG. 1 is a schematic diagram of an image processing system 100 according to an embodiment of the present invention.

FIG. 1 is a schematic diagram of an image processing system 100 according to an embodiment of the present invention. In FIG. 1, an image source 101 provides an image, wherein the image comprises a plurality of pixels arranged in a plurality of lines (for example, M lines) and in a plurality of columns (for example, N columns) forming a two-dimension array, and the pixels may be in a YUV format or RGB format to present the color and information of the image. The image processor 103 receives the image from the image source 101 and practices various kinds of image processing procedures on it, one of which is a scaling procedure, which will be described in more detail hereafter. The image processor 103 in the present invention comprises a scaler 108, which scales-up or scales-down the image with the same hardware comprising a line buffer 102, a first variable 104 and a second variable 106 as shown in FIG. 1. The image processor 103 processes the image to generates a new image comprising a plurality of new pixels arranged in a plurality of lines and in a plurality of columns (not limited to M lines and/or N columns) forming a two-dimension array, and outputs the new image to a displayer 105.

Figure 2:
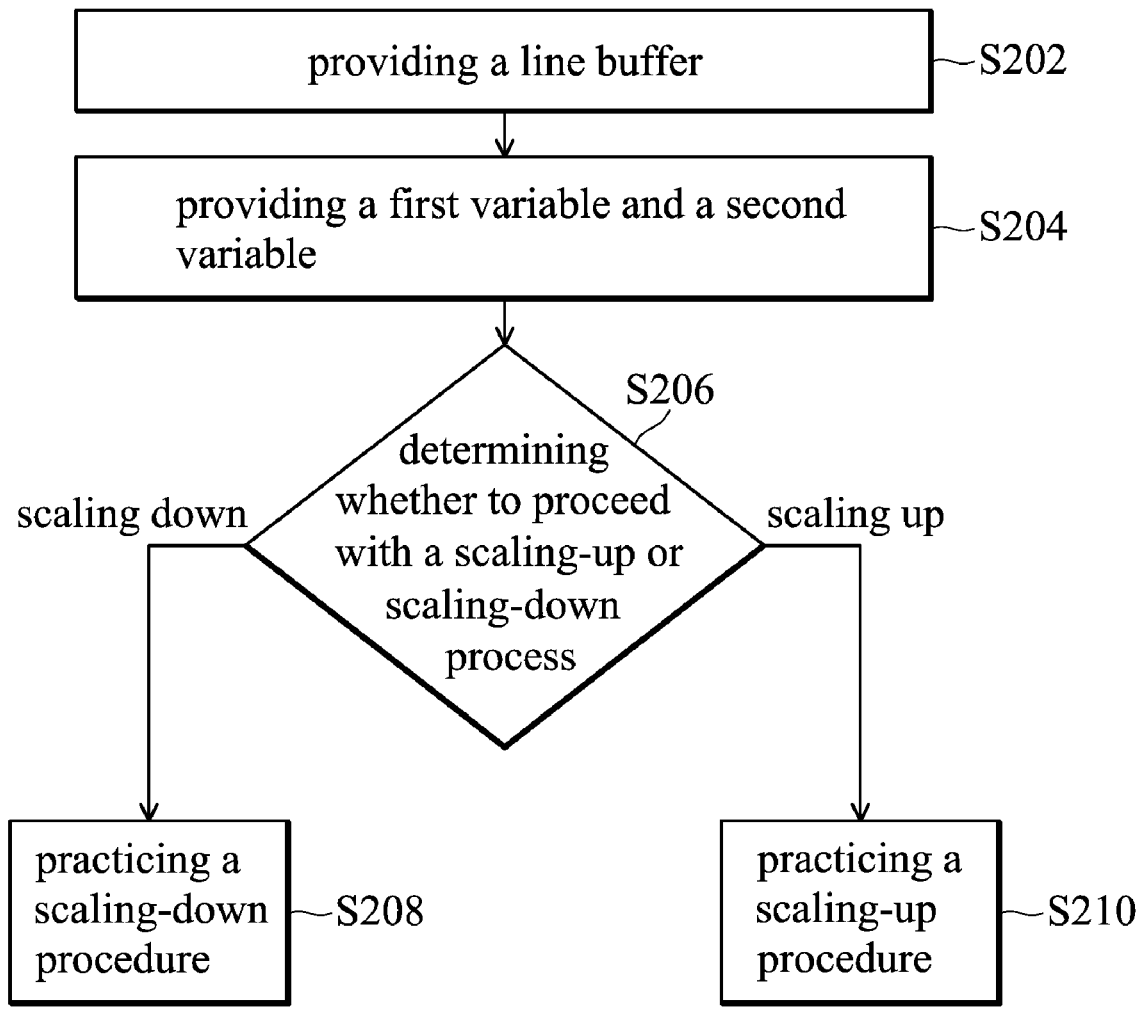
FIG. 2 is a flow chart of the method for scaling-down the image according to an embodiment of the present invention.

For the purpose scale-up of scaling-up or scaling-down the image with the same hardware, a method for scaling-down the image according to an embodiment of the present invention is shown in FIG. 2. The method comprises providing a line buffer 102 in step S202, providing a first variable 104 and a second variable 106 in step S204 and determining whether to proceed with a scaling-up or scaling-down process in step S206. The method further comprises practicing a scaling-down procedure in step S208 when scaling-down the image and practicing a scaling-up procedure in step S210 when scaling-up the image.

Figure 3A:
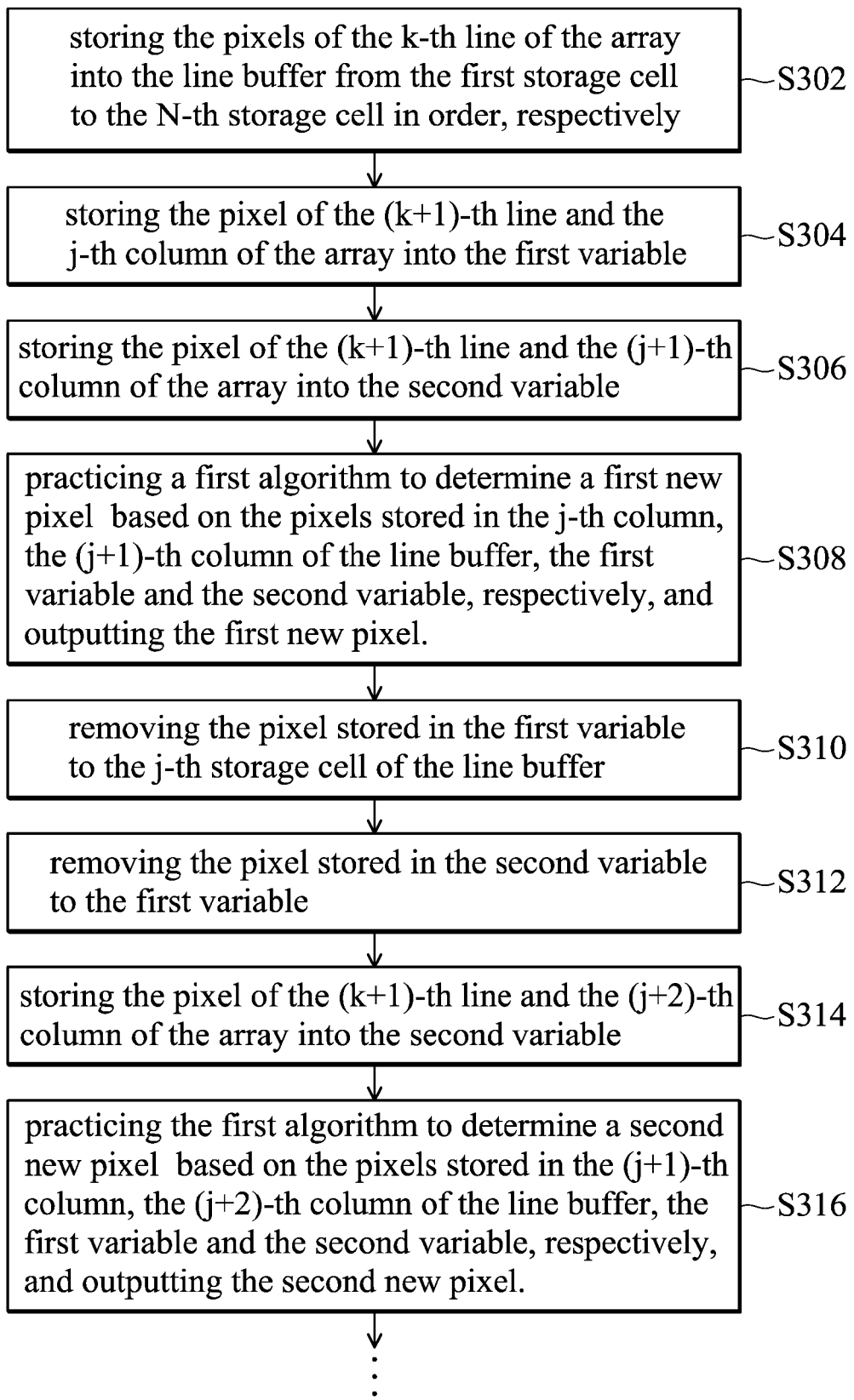
FIG. 3a is a flow chart of the scaling-down procedure according to an embodiment of the present invention.
Figure 3B:
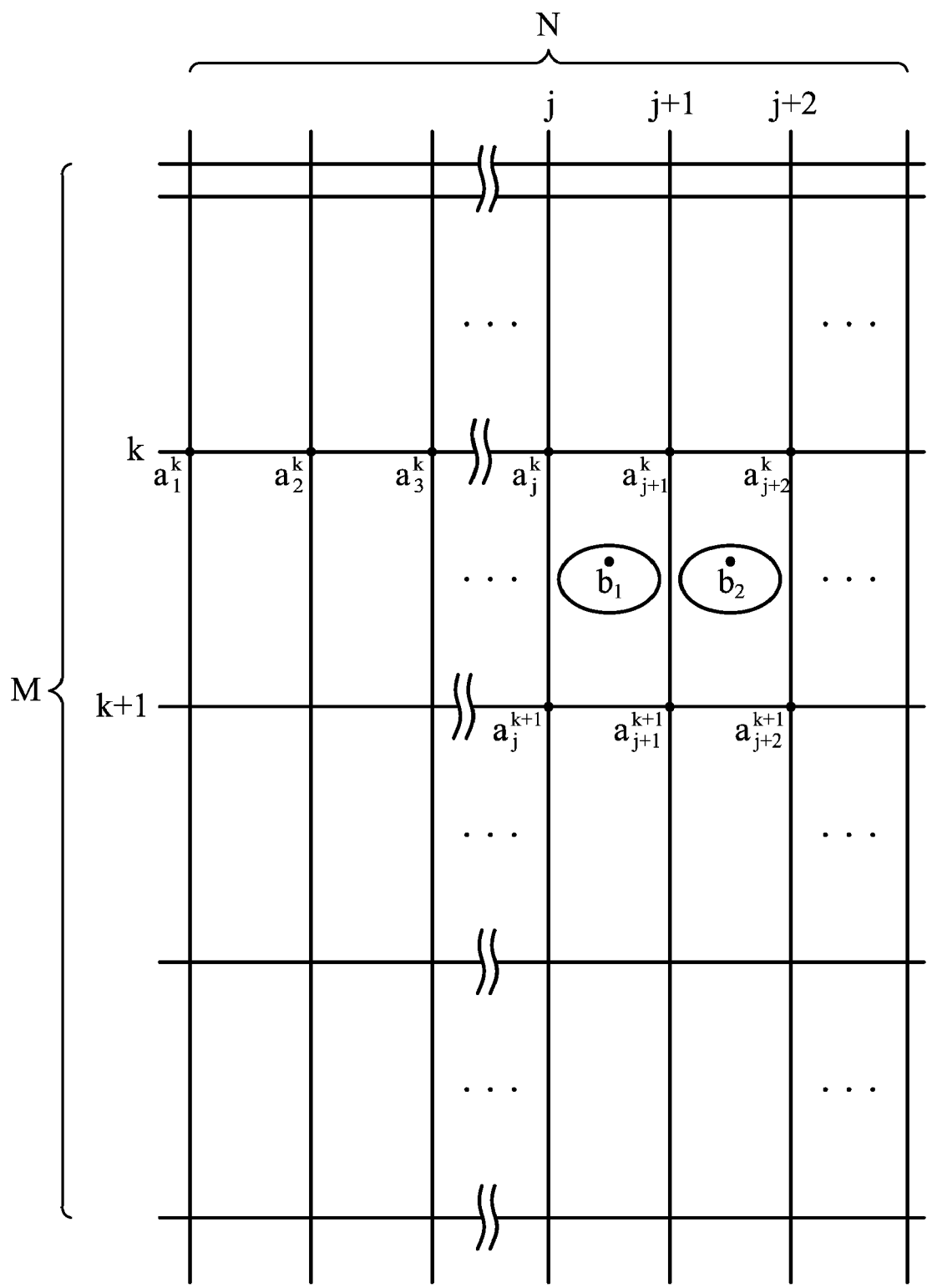
FIG. 3b is an illustrative diagram of the original pixels and the new pixels, respectively, before and after the scaling-down procedure of the present invention.
Figure 3C:
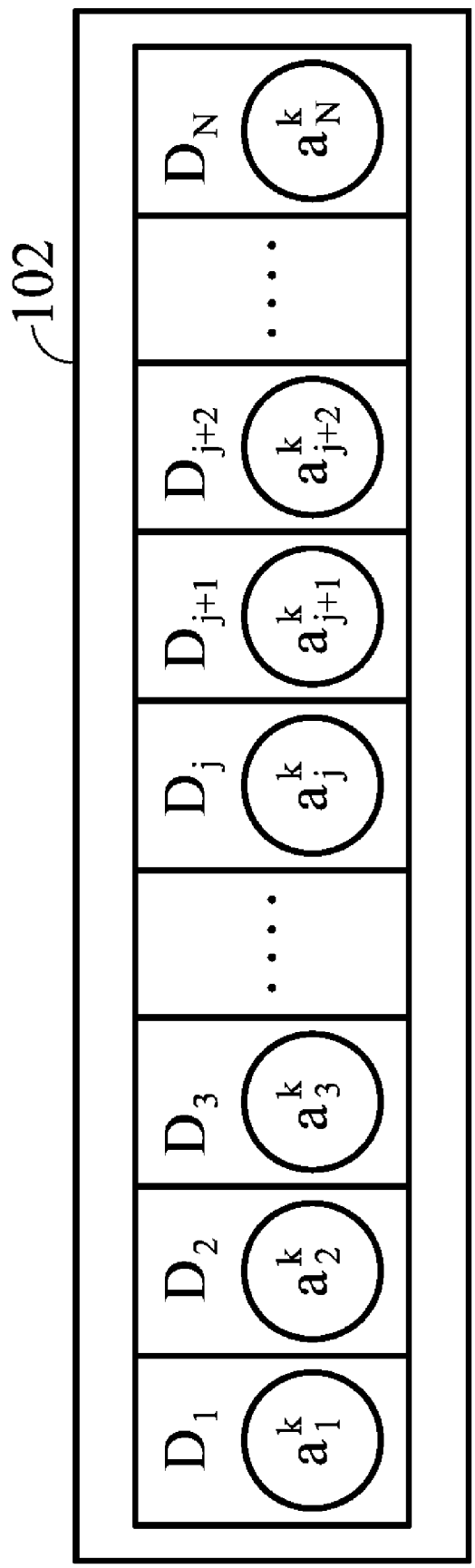
FIG. 3c is an illustrative diagram of the storage data in the line buffer in the step S302 of the present invention.
Figure 3D:
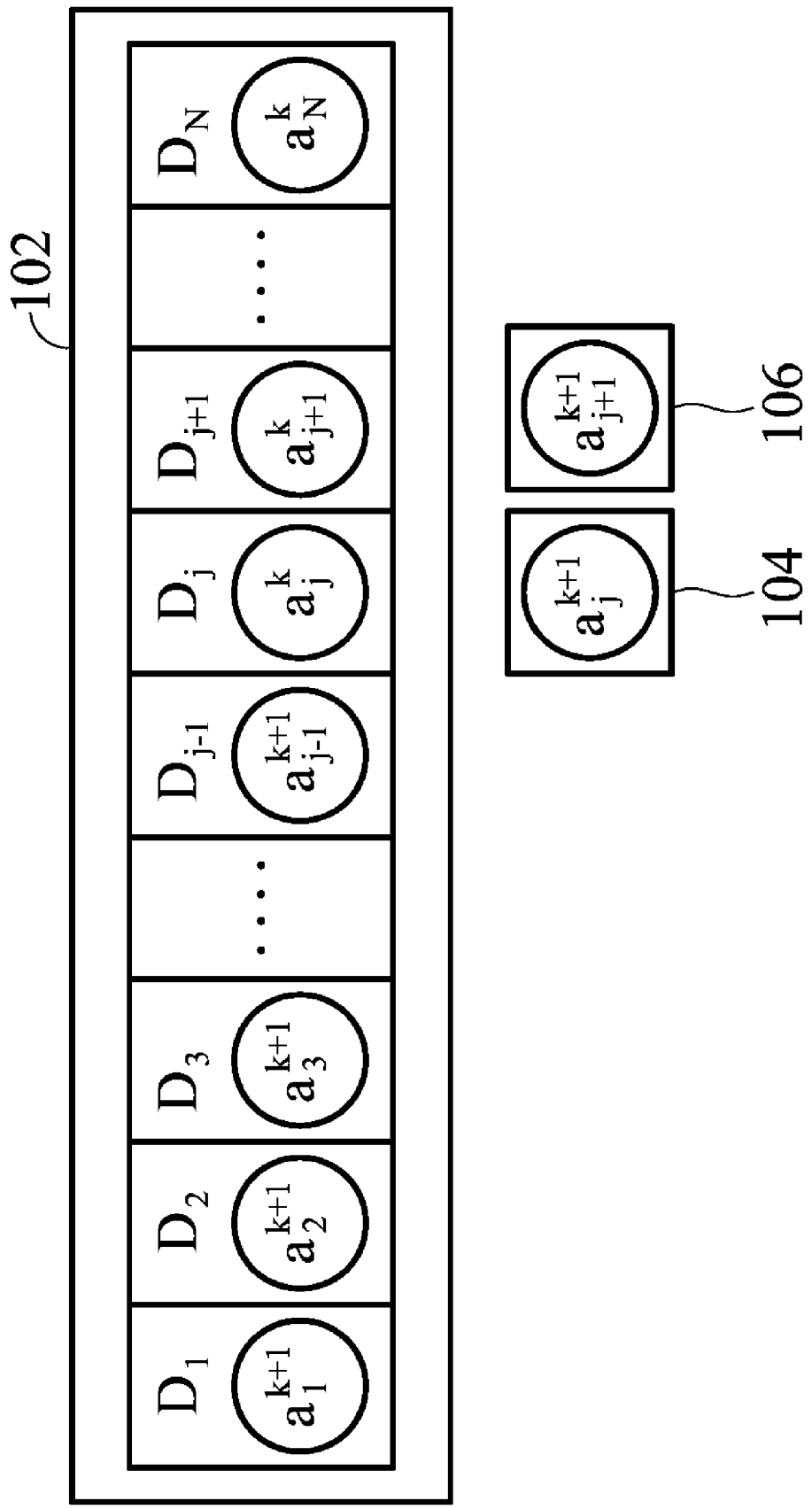
FIG. 3d is an illustrative diagram of the storage data in the line buffer in the step S304 of the present invention.
Figure 3E:
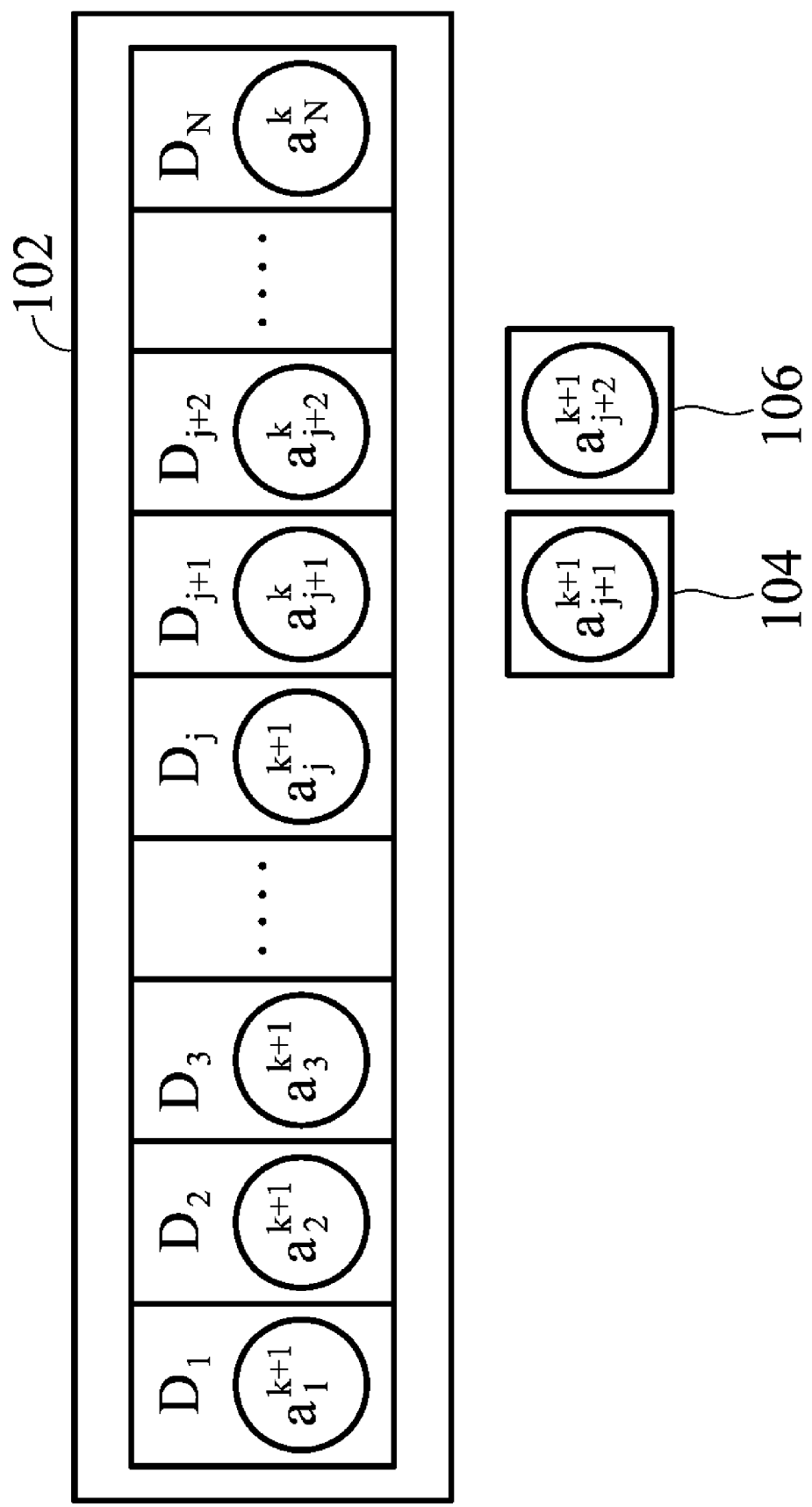
FIG. 3e is an illustrative diagram of the storage data in the line buffer in the step S306 of the present invention.

FIG. 3a is a flow chart of the step S208 in FIG. 2. FIG. 3b is a schematic diagram illustrating an image having a plurality of pixels. In the embodiment, the new pixels b1 and b2 are generated according to an embodiment of the scaling-down procedure shown in FIG. 3b. In the exemplary embodiment, bilinear interpolation could be applied to determine the new pixels when the scaling-down procedure S208 is practiced. For example, the new pixel b1 could be determined based on the pixels $a^k_j, a^k_{j+1}, a^{k+1}_j$ and $a^{k+1}_{j+1}$ and the new pixel b2 could be determined based on the pixels $a^k_{j+1}, a^k_{j+2}, a^{k+1}_{j+1}$ and $a^{k+1}_{j+2}$ and so on, wherein a new scaled down image could be obtained by collecting all the new pixels. In the step S302, the pixels $a^k_1, a^k_2, a^k_3, \ldots a^k_j, a^k_{j+1}, a^k_{j+2}, \ldots a^k_N$ of the k-th line of the array are respectively stored in the storage cells $D_1, D_2, D_3, \ldots D_j, D_{j+1}, D_{j+2}, \ldots D_N$ of the line buffer 102 as shown in FIG. 3c. In the step S304, the pixel $a^{k+1}_j$ of the (k+1)-th line and j-th column of the array is stored in the first variable 104 as shown in FIG. 3d. In the step S306, the pixel $a^{k+1}_{j+1}$ of the (k+1)-th line and (j+1)-th column of the array is stored in the second variable 106 as shown in FIG. 3d. However, note that, in the original case, the image procedure may begin from the pixel of the first column of the first line, but herein, it begins from the pixel of the k-th column of the j-th line herein for illustration. Therefore, the pixels in the storage cells $D_1, D_2, D_3, \ldots D_j$ in FIG. 3d are different from those in FIG. 3c. In the step S308, the scaler 308 practices the first algorithm, for example, bilinear interpolation, to determine a first new pixel $b_1$ (shown in FIG. 3b) based on the pixels ($a^k_j, a^k_{j+1}, a^{k+1}_j$ and $a^{k+1}_{j+1}$) stored in storage cells $D_j$ and $D_{j+1}$, of the first variable 104 and the second variable 106, respectively, and to output the first new pixel $b_1$. In the next step S310, the pixel $a^{k+1}_j$ stored in the first variable 104 is removed to be stored in the j-th storage cell $D_j$ of the line buffer 102, and in the step S312, the pixel ak+1j+1 stored in the second variable 106 is removed to be stored in the first variable 104, and in the step S314, the pixel $a^{k+1}_{j+2}$ of the (k+1)-th line and the (j+2)-th column of the array is stored in the second variable 106. The storage cells of the line buffer 102 after the steps S310, S314 and S316 are shown in FIG. 3e. Similarly, in the step S316, the scaler 108 practices the first algorithm, for example, bilinear interpolation, to determine a second new pixel $b_2$ based on the pixels $a^k_{j+1}, a^k_{j+2}, a^{k+1}_{j+1}$ and $a^{k+1}_{j+2}$ to be stored in the storage cells $D_{j+1}$ and $D_{j+2}$, the first variable 104 and the second variable 106, respectively, and to output the second new pixel b2. The method begins from the pixel $a^k_j$ of j-th column and k-th line, and although only two new pixels are described in the embodiment, those skilled in the art may repeat the steps for all the pixels ($a^k_j$, 1≦k≦M, 1≦j≦N), to determine all new pixels, that result in a scaled-down new image.

Figure 4A:
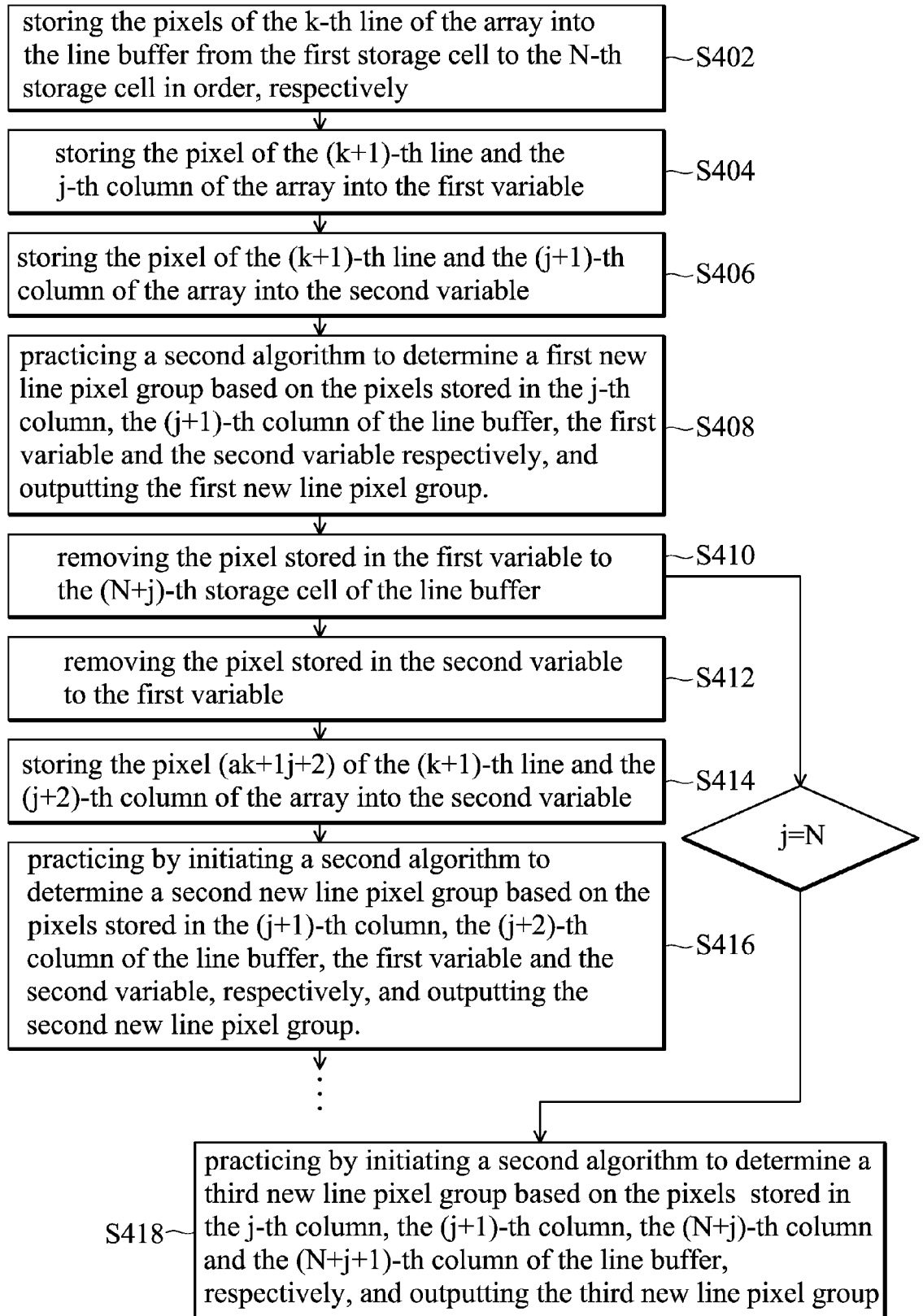
FIG. 4a s a flow chart of the scaling-up procedure according to an embodiment of the present invention.
Figure 4B:
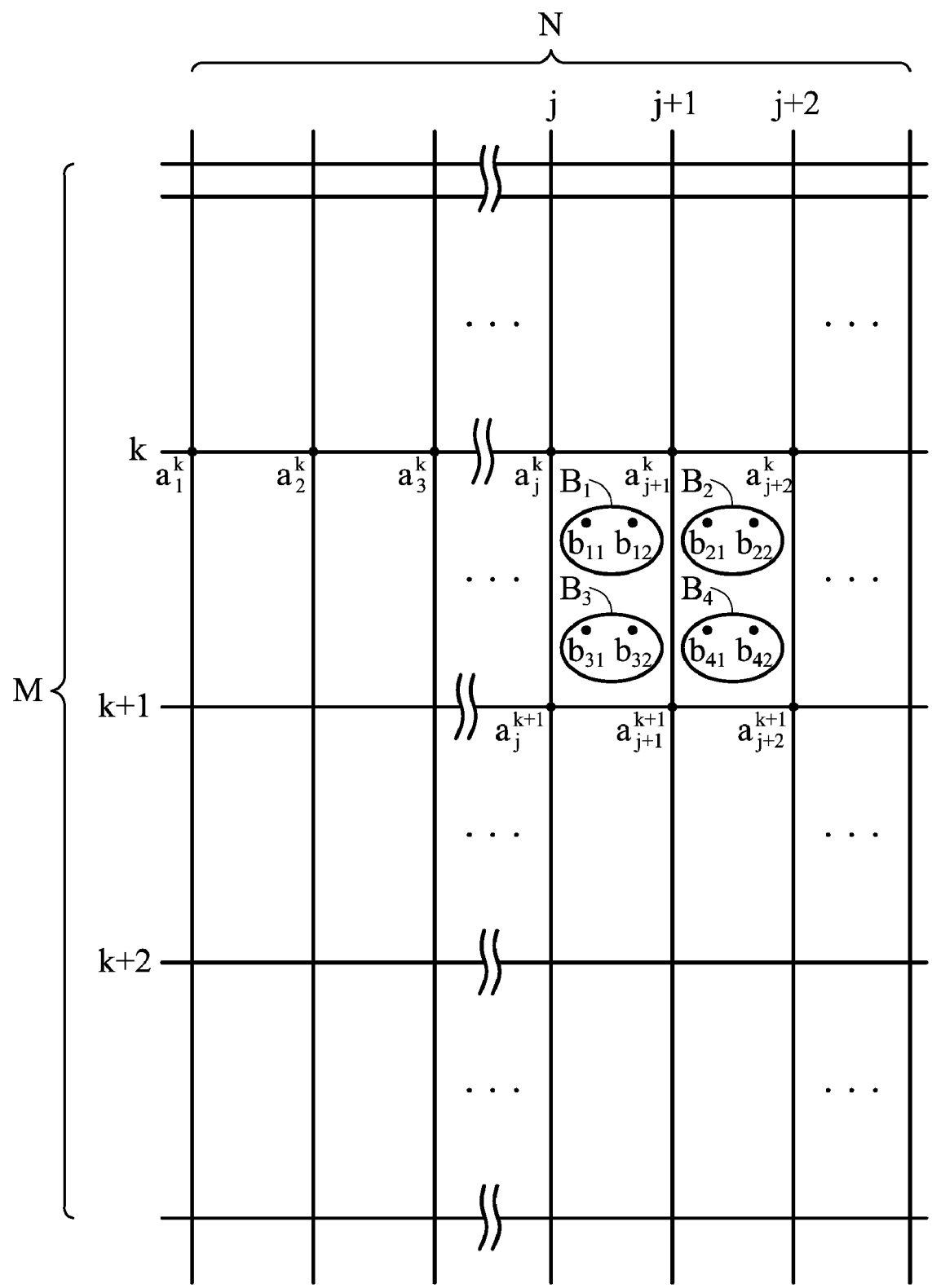
FIG. 4b is an illustrative diagram of the original pixels and the new pixels, respectively, before and after the scaling-up procedure of the present invention.
Figure 4C:
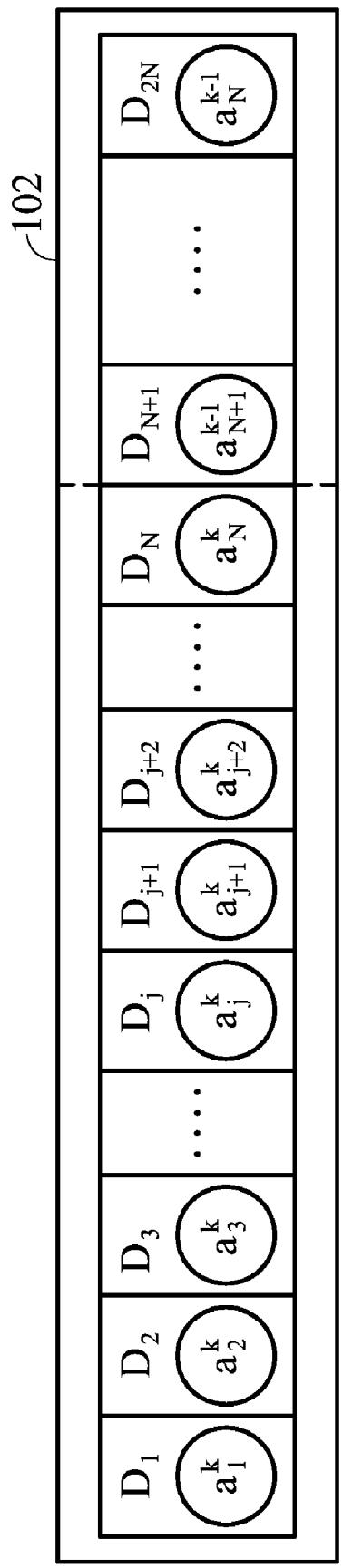
FIG. 4c is an illustrative diagram of the storage data in the line buffer in the step S402 of the present invention.
Figure 4D:
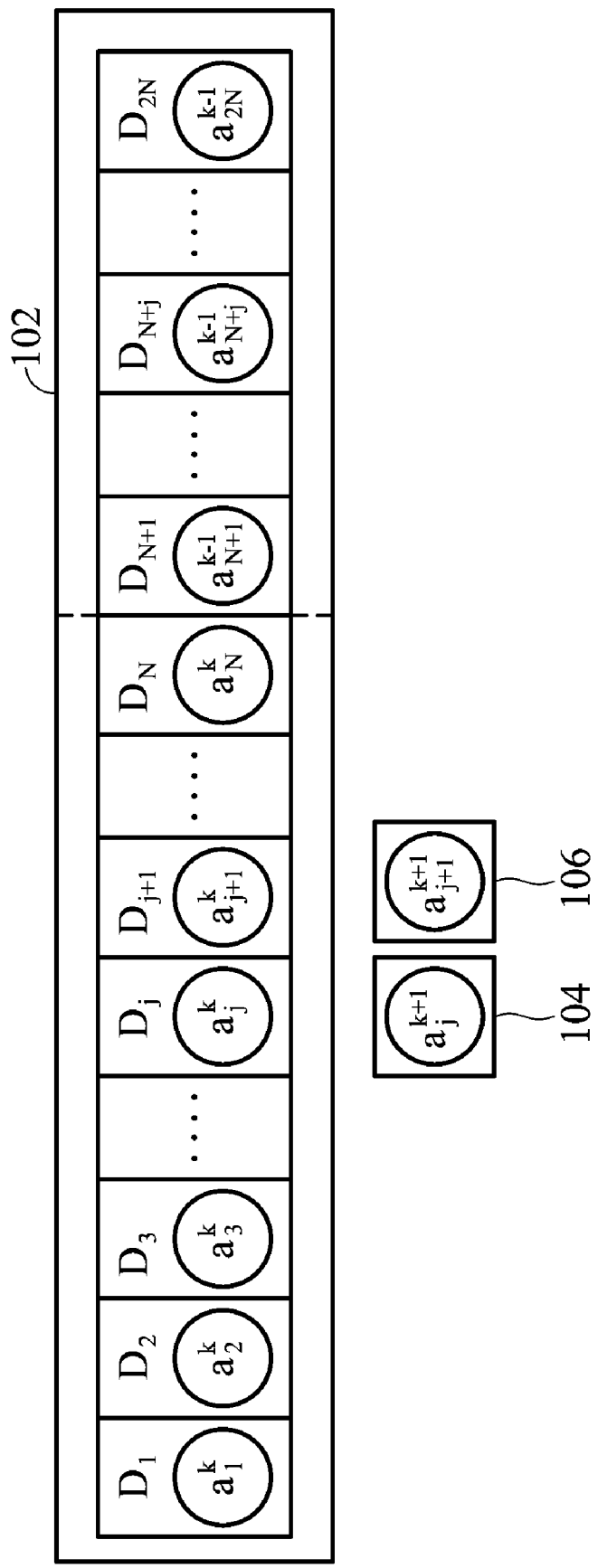
FIG. 4d is an illustrative diagram of the storage data in the line buffer in the step S404 of the present invention.
Figure 4E:
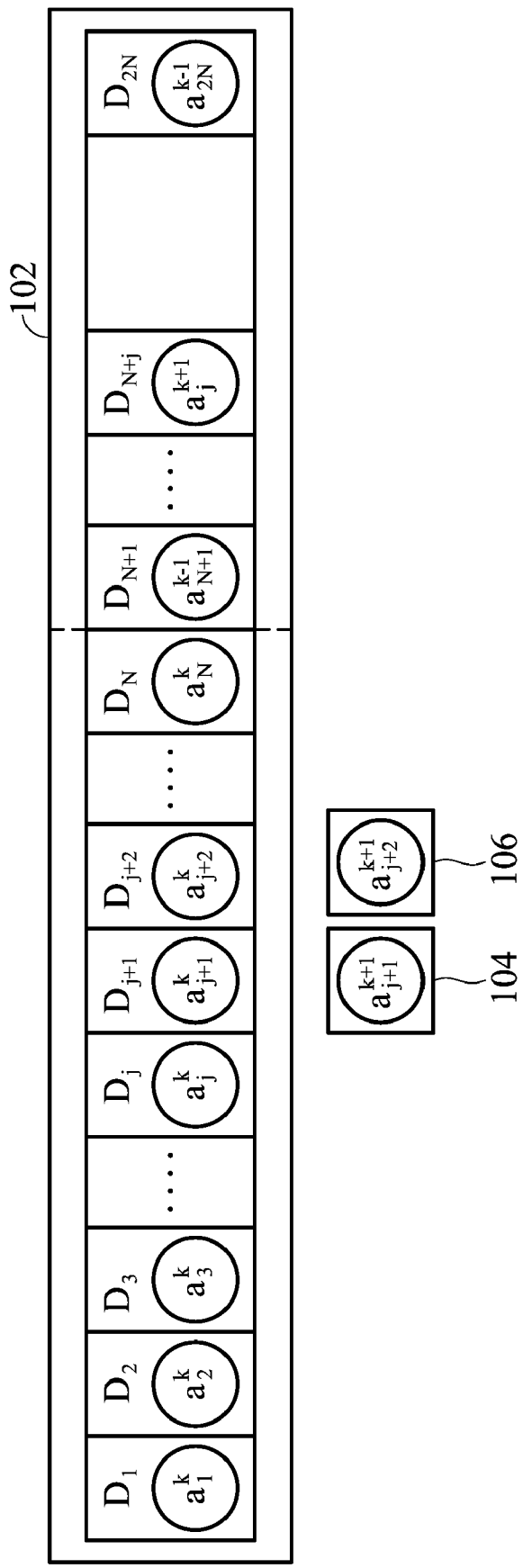
FIG. 4e is an illustrative diagram of the storage data in the line buffer in the step S406 of the present invention.
Figure 4F:
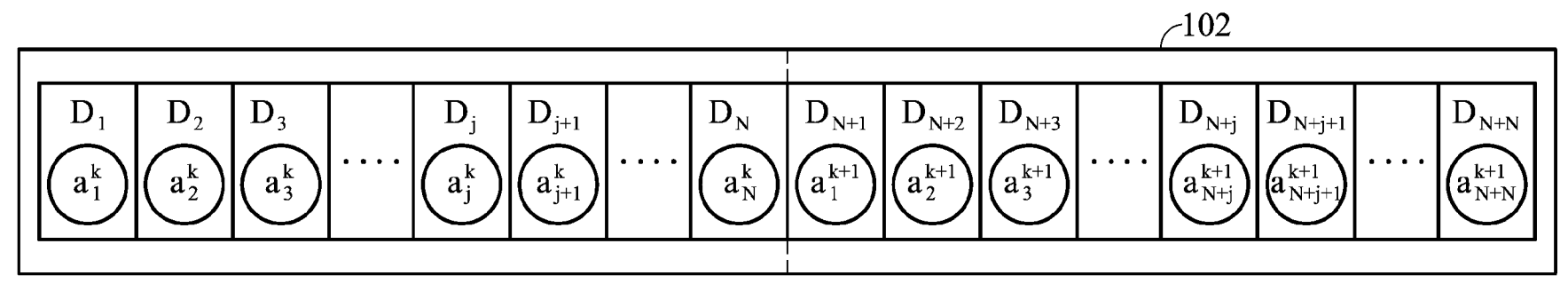

FIG. 4a is a flow chart of the step S210 in FIG. 2. The FIG. 4b is a schematic diagram illustrating an image having a plurality of pixels. In an exemplary embodiment, the bilinear interpolation could be applied to determine a new line pixel group $B_1$ (further comprising new pixels $b_{11}$ and $b_{12}$) and a new third line pixel group $B_3$ (further comprising new pixels $b_{31}$ and $b_{32}$) based on pixels $a^k_j, a^k_{j+1}, a^{k+1}_j$ and $a^{k+1}_{j+1}$ and a new line pixel group $B_2$ (further comprising new pixels $b_{21}$ and $b_{22}$) and a new fourth line pixel group $B_4$ (further comprising new pixels $b_{41}$ and $b_{42}$) based on pixels $a^k_{j+1}, a^k_{j+2}, a^{k+1}_{j+1}$ and $a^{k+1}_{j+2}$ and so on. Thus, a new scaling-up image could be obtained by collecting all the original pixels and all the new pixels. In the step S402, the pixels $a^k_1, a^k_2, a^k_3, \ldots, a^k_j, a^k_{j+1}, a^k_{j+2}, \ldots a^k_N$ of the k-th line of the array are stored, respectively, into the storage cells $D_1, D_2, D_3, \ldots D_j, D_{j+1}, D_{j+2}, \ldots D_N$ of the line buffer 102 as shown in FIG. 4c. In the step S404, the pixel $a^{k+1}_j$ of the (k+1)-th line and the j-th column of the array is stored in the first variable 104 as shown in FIG. 4d. In the step S406, the pixel $a^{k+1}_{j+1}$ of the (k+1)-th line and the (j+1)-th column of the array is stored in the second variable 106. However, note that, in the original case, the image procedure may begin from the pixel of the first column of the first line, but herein, it begins from the pixel of the k-th column of the j-th line for illustration. In the step S408, the scaler 108 practices a second algorithm, for example, bilinear interpolation, to determine a first new line pixel group $B_1$ (further comprising new pixels $b_{11}$ and $b_{12}$ as FIG. 4b) $a^k_{j+1}, a^{k+1}_j$ and $a^{k+1}_{j+1}$ respectively, stored in the storage cells $D_j$ and $D_{j+1}$, and the first variable 104 and the second variable 106, and then outputs the first new line pixel group $B_1$. Next, in the step S410, the pixel $a^k_j$ stored in the first variable 104 is removed to be stored in the (N+j)-th storage cell $D_{n+j}$ of the line buffer 102, and in the step S412, the pixel $a^{k+1}_{j+1}$ stored in the second variable 106 is removed to be stored in the first variable 104, and in the step S414, the pixel $a^{k+1}_{j+2}$ of the (k+1)-th line and the (j+2)-th column of the array is stored in the second variable 106. The storage cells of the line buffer 102 after the steps S410, S414 and S416 are shown in FIG. 4e. Similarly, in the step S416, a second new line pixel group $B_2$ (further comprising new pixels b11 and b12 as shown in FIG. 4b) based on the pixels $a^k_{j+1}$, $a^k_{j+2}$, $a^{k+1}_{j+1}$ and $a^{k+1}_{j+2}$ respectively, stored in the storage cells $D_{j+1}$ and $D_{j+2}$, and the first variable 104 and the second variable 106, and then outputs the second new line pixel group $B_2$. When scaling-up the image, the interpolation is used to generate four new pixels ($b_{11}$, $b_{12}$, $b_{31}$, $b_{32}$ as shown in FIG. 4b) based on the four adjacent pixels ($a^k_{j+1}$, $a^k_{j+2}$, $a^{k+1}_{j+1}$, $a^{k+1}_{j+2}$ as shown in FIG. 4b), and then the new scaling-up image could be obtained by collecting all the original pixels and all the new pixels. However, according to an embodiment of the image displaying method, all the new pixels of the same line, for example, $b_{11}$, $b_{12}$, $b_{31}$, $b_{32}$, have to be outputted to a displayer before outputting the new pixels of the next line, for example, $b_{31}$, $b_{32}$, $b_{41}$, $b_{42}$. Therefore, in the present invention, the method to store pixels of the next line in the scaling-up procedure (referring to the step S410) is different than that in the scaling-down procedure (referring to the step S310). Thus, the step S410 of the scaling-up procedure is performed when j is equal to N, and further comprises practicing by initiating a second algorithm to determine at least a third new line pixel group $B_3$ (further comprises $b_{31}$ and $b_{32}$ shown in FIG. 4b) based on the pixels $a^k_j$, $a^k_{j+1}$, $a^{k+1}_j$ and $a^{k+1}_{j+1}$ respectively stored in the j-th, the (j+1)-th, the (N+j)-th and the (N+j+1)-th column of the line buffer 102, and outputting the third new line pixel group $B_3$. Note that the other new pixels in the same line with the third new line pixels $B_3$, for example, $b_{41}$ and $b_{42}$ of a fourth new line pixels $B_4$, are determined and outputted in similar way as discussed above as shown in FIG. 4f. While the method begins from the pixel $a^k_j$ of j-th column and k-th line, and only four new line pixel groups $B_1$, $B_2$, $B_3$ and $B_4$ are described in the embodiment, those skilled in the art may repeat the steps for all the pixels ($a^k_j$, 1□k□M, 1□j□N), to determine all new pixels, that result in a scaled-up new image.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, used to scale-upscale-up and scale-down an image with the same hardware, wherein the image comprises a plurality of pixels ({$a^k_j$, 1□k□M, 1□j□N}) arranged in a plurality of lines (M lines) and in a plurality of columns (N columns) forming a two-dimension array, comprising:

providing a line buffer comprising at least 2N storage cells;

providing a first variable and a second variable for cooperating with the line buffer to scale-upscale-up and scale-down the image; and practicing a scaling-down procedure when scaling-down the image, wherein the scaling-down procedure comprises:

storing the pixels ({$a^k_j$, j=1, 2, 3, . . . N}) of the k-th line of the array into the line buffer from the first storage cell to the N-th storage cell in order, respectively;

storing the pixel ($a^{k+1}_j$) of the (k+1)-th line and the j-th column of the array into the first variable;

storing the pixel ($a^{k+1}_{j+1}$) of the (k+1)-th line and the (j+1)-th column of the array into the second variable;

practicing a first algorithm to determine a first new pixel ($b^k_j$) based on the pixels ($a^k_j$, $a^k_{j+1}$, $a^{k+1}_j$ and $a^{k+1}_{j+1}$) stored in the j-th column, the (j+1)-th column of the line buffer, the first variable and the second variable, respectively, and outputting the first new pixel ($b^k_j$);

removing the pixel stored in the first variable to the j-th storage cell of the line buffer;

removing the pixel stored in the second variable to the first variable;

storing the pixel ($a^{k+1}_{j+2}$) of the (k+1)-th line and the (j+2)-th column of the array into the second variable; and practicing the first algorithm to determine a second new pixel ($b^k_{j+1}$) based on the pixels ($a^k_{j+1}$, $a^k_{j+2}$, $a^{k+1}_{j+1}$ and $a^{k+1}_{j+2}$) stored in the (j+1)-th column, the (j+2)-th column of the line buffer, the first variable and the second variable, respectively, and outputting the second new pixel ($b^k_{j+1}$).

2. The image processing method as claimed in claim 1, further comprising practicing a scaling-up procedure when scaling-up the image, wherein the scaling-up procedure comprises:

storing the pixels ({$a^k_j$, j=1, 2, 3, . . . N}) of the k-th line of the array into the line buffer from the first storage cell to the N-th storage cell in order, respectively;

storing the pixel ($a^{k+1}_j$) of the (k+1)-th line and the j-th column of the array into the first variable;

storing the pixel ($a^{k+1}_{j+1}$) of the (k+1)-th line and the (j+1)-th column of the array into the second variable;

practicing a second algorithm to determine a first new line pixel group based on the pixels ($a^k_j$, $a^k_{j+1}$, $a^{k+1}_j$ and $a^{k+1}_{j+1}$) stored in the j-th column, the (j+1)-th column of the line buffer, the first variable and the second variable respectively, and outputting the first new line pixel group;

removing the pixel stored in the first variable to the (N+j)-th storage cell of the line buffer;

removing the pixel stored in the second variable to the first variable;

storing the pixel ($a^{k+1}_{j+2}$) of the (k+1)-th line and the (j+2)-th column of the array into the second variable; and practicing by initiating a second algorithm to determine a second new line pixel group based on the pixels ($a^k_{j+1}$, $a^k_{j+2}$, $a^{k+1}_{j+1}$ and $a^{k+1}_{j+2}$) stored in the (j+1)-th column, the (j+2)-th column of the line buffer, the first variable and the second variable, respectively, and outputting the second new line pixel group.

3. The image processing method as claimed in claim 1, wherein removing the pixel stored in the first variable to the (N+j)-th storage cell of the line buffer further comprises practicing by initiating a second algorithm to determine a third new line pixel group based on the pixels ($a^k_j$, $a^k_{j+1}$, $a^{k+1}_j$ and $a^{k+1}_{j+1}$) stored in the j-th column, the (j+1)-th column, the (N+j)-th column and the (N+j+1)-th column of the line buffer, respectively, and outputting the third new line pixel group when j is equal to N.

4. The image processing method as claimed in claim 1, wherein the first and second algorithms are bilinear interpolated.

5. The image processing method as claimed in claim 1, wherein the pixels are in a YUV format.

6. The image processing method as claimed in claim 1, wherein the pixels are in an RPG format.

7. An image processing apparatus, used to scale-upscale-up and scale-down an image with the same hardware, wherein the image comprises a plurality of pixels ($\{a^k_j, 1 \leq k \leq M, 1 \leq j \leq N\}$) arranged in a plurality of lines (M lines) and in a plurality of columns (N columns) forming a two-dimension array, comprising:

a line buffer, comprising at least 2N storage cells;

a first variable and a second variable, for cooperating with the line buffer to scale-upscale-up and scale-down the image; and a scaler, for practicing a scaling-down procedure to scale down the images, wherein the scaling-down procedure comprises:

storing the pixels ($\{a^k_j, j=1, 2, 3, \ldots N\}$) of the k-th line of the array into the line buffer from the first storage cell to the N-th storage cell in order, respectively;

storing the pixel ($a^{k+1}_j$) of the (k+1)-th line and the j-th column of the array into the first variable;

storing the pixel ($a^{k+1}_{j+1}$) of the (k+1)-th line and the (j+1)-th column of the array into the second variable;

practicing a first algorithm to determine a first new pixel ($b^k_j$) based on the pixels ($a^k_j$, $a^k_{j+1}$, $a^{k+1}_j$ and $a^{k-1}_{j+1}$) stored in the j-th column, the (j+1)-th column of the line buffer, the first variable and the second variable, respectively, and outputting the first new pixel ($b^k_j$);

removing the pixel stored in the first variable to the j-th storage cell of he line buffer;

removing the pixel stored in the second variable to the first variable;

storing the pixel ($a^{k+1}_{j+2}$) of the (k+1)-th line and the (j+2)-th column of the array into the second variable; and practicing the first algorithm to determine a second new pixel ($b^k$j+1) based on the pixels ($a^k_{j+1}$, $a^k_{j+2}$, $a^{k+1}_{j+1}$ and $a^{k+1}_{j+2}$) stored in the (j+1)-th column, the (j+2)-th column of the line buffer, the first variable and the second variable, respectively, and outputting the second new pixel ($b^k_{j+1}$).

8. The image processing apparatus as claimed in claim 7, wherein the scaler practices a scaling-up procedure to scale-up images, wherein the scaling-up procedure comprises:

storing the pixels ($\{a^k_j, j=1, 2, 3, \ldots N\}$) of the k-th line of the array into the line buffer from the first storage cell to the N-th storage cell in order, respectively;

storing the pixel ($a^{k+1}_j$) of the (k+1)-th line and the j-th column of the array into the first variable;

storing the pixel ($a^{k+1}_{j+1}$) of the (k+1)-th line and the (j+1)-th column of the array into the second variable;

practicing a second algorithm to determine a first new line pixel group based on the pixels ($a^k_j$, $a^k_{j+1}$, $a^{k+1}_j$ and $a^{k+1}_{j+1}$) stored in the j-th column, the (j+1)-th column of the line buffer, the first variable and the second variable, respectively, and outputting the first new line pixel group;

removing the pixel stored in the first variable to the (N+j)-th storage cell of the line buffer;

removing the pixel stored in the second variable to the first variable;

storing the pixel ($a^{k+1}_{j+2}$) of the (k+1)-th line and the (j+2)-th column of the array into the second variable; and practicing by initiating a second algorithm to determine a second new line pixel group based on the pixels ($a^k_{j+1}$, $a^k_{j+2}$, $a^{k+1}_{j+1}$ and $a^{k+1}_{j+2}$) stored in the (j+1)-th column, the (j+2)-th column of the line buffer, the first variable and the second variable respectively, and outputting the second new line pixel group.

9. The image processing apparatus as claimed in claim 8, wherein removing the pixel stored in the first variable to the (N+j)-th storage cell of the line buffer, further comprises practicing, by initiating a second algorithm to determine a third new line pixel group based on the pixels ($a^k_j$, $a^k_{j+1}$, $a^{k+1}_j$ and $a^{k+1}_{j+1}$) stored in the j-th column, the (j+1)-th column, the (N+j)-th column and the (N+j+1)-th column of the line buffer, respectively, and outputting the third new line pixel group when j is equal to N.

10. The image processing apparatus as claimed in claim 7, wherein the first and second algorithms are bilinear interpolated.

* * * * *